(12) United States Patent
Jaglan et al.

(10) Patent No.: US 11,919,365 B2
(45) Date of Patent: Mar. 5, 2024

(54) BLOWER MOTOR OPERATION

(71) Applicant: Ford Global Technologies, LLC, Dearborn, MI (US)

(72) Inventors: Jasbir Jaglan, Ann Arbor, MI (US); William Stewart Johnston, South Lyon, MI (US); Alan Douglas Wallington, Livonia, MI (US); Curtis Mark Jones, Wixom, MI (US); Chris George Oehring, Monroe, MI (US); Mark G. Smith, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/882,260

(22) Filed: Aug. 5, 2022

(65) Prior Publication Data

US 2022/0371400 A1    Nov. 24, 2022

Related U.S. Application Data

(62) Division of application No. 15/782,081, filed on Oct. 12, 2017, now Pat. No. 11,413,932.

(51) Int. Cl.
*B60H 1/00* (2006.01)

(52) U.S. Cl.
CPC ..... *B60H 1/00735* (2013.01); *B60H 1/00385* (2013.01); *B60H 1/004* (2013.01); *B60H 1/00764* (2013.01); *B60H 1/008* (2013.01); *B60H 1/00828* (2013.01); *B60H 1/00964* (2013.01); *B60H 1/00428* (2013.01); *B60H 1/00821* (2013.01)

(58) Field of Classification Search
CPC ...... B60H 1/00735; B60H 1/00385; B60H 1/004; B60H 1/00764; B60H 1/008; B60H 1/00828; B60H 1/00964; B60H 1/00428; B60H 1/00821; B60H 1/00878
USPC .......................................................... 454/75
See application file for complete search history.

(56) References Cited

U.S. PATENT DOCUMENTS 4,809,517 A  *  3/1989  Miyanaga .......... B60H 1/00964
62/163
5,427,313 A     6/1995  Davis, Jr. et al.
(Continued)

FOREIGN PATENT DOCUMENTS

CN      106627033 A  *  5/2017   ......... B60H 1/00028
CN      112078327 A     12/2020
(Continued)

*Primary Examiner* — Edelmira Bosques
*Assistant Examiner* — Frances F. Hamilton
(74) *Attorney, Agent, or Firm* — David B. Kelley; Brooks Kushman P.C.

(57) ABSTRACT

A method of operating a vehicle climate system when an ambient temperature is below a threshold temperature is provided. In response to an ambient temperature being less than a threshold temperature, a controller is adapted to operate a blower motor at a voltage that depends on whether the vehicle is in charge sustain mode or charge deplete mode. In response to an ambient temperature being greater than a threshold temperature, the controller is adapted to operate the blower motor at a voltage that does not depend on whether in the charge sustain or charge deplete modes.

5 Claims, 3 Drawing Sheets

(56) References Cited

U.S. PATENT DOCUMENTS

| | | |
|---|---|---|
| 5,706,667 A * | 1/1998 | Iritani .............. B60H 1/00828 454/99 |
| 6,072,153 A * | 6/2000 | Aoki .................. B60H 1/2218 219/202 |
| 6,464,027 B1 * | 10/2002 | Dage ..................... F01P 3/20 123/41.14 |
| 6,712,133 B1 | 3/2004 | Kyrtsos et al. |
| 6,840,055 B2 | 1/2005 | Iritani |
| 7,325,595 B2 | 2/2008 | Homan et al. |
| 8,096,482 B2 | 1/2012 | Dage |
| 8,125,099 B2 | 2/2012 | Flick |
| 8,151,581 B2 | 4/2012 | Chen et al. |
| 8,206,204 B2 | 6/2012 | Bryant et al. |
| 8,707,718 B2 | 4/2014 | Chen et al. |
| 8,774,999 B2 | 7/2014 | Takeda |
| 9,067,475 B1 | 6/2015 | Jeong |
| 9,170,585 B2 | 10/2015 | Flick |
| 9,181,916 B2 | 11/2015 | Wijaya et al. |
| 9,260,103 B2 | 2/2016 | Porras et al. |
| 9,428,035 B2 | 8/2016 | Elsenhour |
| 9,446,772 B2 | 9/2016 | Lovett et al. |
| 9,586,459 B2 | 3/2017 | Markowitz et al. |
| 9,610,826 B2 | 4/2017 | Takata et al. |
| 9,631,547 B2 | 4/2017 | Porras et al. |
| 9,662,959 B2 * | 5/2017 | Pebley ............... B60H 1/00778 |
| 10,363,794 B2 | 7/2019 | Lim et al. |
| 10,406,887 B2 | 9/2019 | Jeong |
| 2002/0185546 A1 | 12/2002 | Homan et al. |
| 2004/0168454 A1 | 9/2004 | Iritani |
| 2005/0056413 A1 | 3/2005 | Homan et al. |
| 2006/0117775 A1 * | 6/2006 | Dage ..................... B60H 1/004 62/230 |
| 2010/0019048 A1 | 1/2010 | Flick |
| 2010/0023210 A1 | 1/2010 | Flick |
| 2012/0077426 A1 | 3/2012 | Dage |
| 2012/0014484 A1 | 6/2012 | Smith et al. |
| 2012/0290161 A1 * | 11/2012 | Takeda ................ B60L 1/00 903/930 |
| 2013/0081419 A1 * | 4/2013 | Katoh .................. F25B 47/02 62/278 |
| 2013/0139532 A1 | 6/2013 | Hashigaya et al. |
| 2013/0168458 A1 | 7/2013 | Ichishi et al. |
| 2013/0332013 A1 * | 12/2013 | Malone .................. B60K 6/48 701/22 |
| 2014/0011008 A1 | 4/2014 | Porras |
| 2014/0116673 A1 * | 5/2014 | Kang ................ B60H 1/00921 237/12.3 R |
| 2014/0144998 A1 * | 5/2014 | Ichishi .................. B60H 1/004 237/12.3 A |
| 2015/0094894 A1 * | 4/2015 | Ito ............................ B60L 1/02 180/65.265 |
| 2015/0158367 A1 * | 6/2015 | Jeong .................... B60H 1/004 701/36 |
| 2015/0183296 A1 | 7/2015 | Ragazzi |
| 2015/0224848 A1 | 8/2015 | Eisenhour |
| 2015/0273982 A1 | 10/2015 | Takata et al. |
| 2016/0185186 A1 * | 6/2016 | Miyakoshi ......... B60H 1/00921 62/160 |
| 2016/0236539 A1 * | 8/2016 | Suzuki ............... B60H 1/00921 |
| 2016/0332502 A1 | 11/2016 | Rollinson et al. |
| 2016/0361974 A1 | 12/2016 | Porras et al. |
| 2017/0054188 A1 | 2/2017 | Blatchley et al. |
| 2017/0057322 A1 | 3/2017 | Kava et al. |
| 2017/0088114 A1 * | 3/2017 | Nawata .................. B60K 6/445 |
| 2017/0136847 A1 * | 5/2017 | Lim .................. B60H 1/00885 |
| 2017/0144505 A1 | 5/2017 | Markowitz et al. |
| 2017/0182860 A1 * | 6/2017 | Miyakoshi ........... B60H 1/0073 |
| 2018/0029439 A1 | 2/2018 | Jeong |
| 2018/0105022 A1 | 4/2018 | Jones et al. |
| 2018/0170398 A1 | 6/2018 | Miller et al. |
| 2018/0312037 A1 | 11/2018 | Uesugi et al. |
| 2019/0315192 A1 | 10/2019 | Smith et al. |

FOREIGN PATENT DOCUMENTS

| | | | |
|---|---|---|---|
| KR | 20050058661 A * | 6/2005 | ......... B60H 1/00807 |
| KR | 20170056923 A | 5/2017 | |
| KR | 102473096 B1 * | 11/2022 | |
| WO | WO2012040022 A2 | 3/2012 | |
| WO | WO2013011632 A1 | 1/2013 | |

* cited by examiner

BLOWER MOTOR OPERATION

CROSS-REFERENCE TO RELATED APPLICATION

This application is a division of U.S. application Ser. No. 15/782,081, filed Oct. 12, 2017, the disclosure of which is hereby incorporated in its entirety by reference herein.

TECHNICAL FIELD

This disclosure relates to operation of blower motors, and more particularly, to operation of blower motors in hybrid electric vehicles as a function of ambient temperature and vehicle operation mode.

BACKGROUND

A hybrid electric vehicle (HEV) can be propelled by an engine and an electric machine energized by a traction battery. A plug-in hybrid electric vehicle (PHEV) includes a traction battery that can be charged via electrically connection to an external power source. A battery electric vehicle (BEV) does not include an engine and is propelled only by an electric machine. HEVs, PHEVs and BEVs are three examples of vehicles that are at least partially propelled by an electric machine. In such applications, a traction battery can include a battery pack having individual cells that are charged and discharged during operation. The traction battery may also discharge electric power from and transfer electric power between the cells during cell balancing operations.

In addition to propelling the vehicle, electric power may be used to supply onboard auxiliary loads. For example, electric power may be delivered to blower motors as used in a climate control system of the vehicle.

SUMMARY

In at least one approach, a method of operating a vehicle climate system when an ambient temperature is below a threshold temperature is provided. The method may include, responsive to ambient temperatures less than a threshold, operating a blower motor at a voltage that depends on whether the vehicle is in charge sustain mode or charge deplete mode. The method may further include responsive to ambient temperatures greater than the threshold, operating the blower motor at a voltage that does not depend on whether in the charge sustain or charge deplete modes.

In at least one approach, a method of operating a vehicle climate system when an ambient temperature is below a threshold temperature is provided. The method may include, responsive to ambient temperatures less than a threshold, operating a blower motor at a voltage that depends on whether the vehicle climate system is operating in an automatic climate control mode or a manual climate control mode. The method may further include, responsive to ambient temperatures greater than the threshold, operating the blower motor at a voltage that does not depend on whether the vehicle climate system is operating in the automatic climate control mode or the manual climate control mode.

In at least one approach, a method of operating a vehicle climate system when an ambient temperature is below a threshold temperature is provided. The method may include operating a blower motor according to a first blower parameter and when an engine is being used to propel the vehicle when the ambient temperature is below a threshold temperature. The method may also include operating the blower motor according to a second blower parameter different than the first blower parameter when an electric machine and not the engine is being used to propel the vehicle when the ambient temperature is below a threshold temperature.

A climate system for a vehicle is provided. The climate system may include a blower motor and a climate controller. When an engine is propelling the vehicle, the climate controller may be configured to operate the blower motor according to a first blower parameter when an ambient temperature is below a threshold temperature. When an electric machine and not the engine is propelling the vehicle, the climate controller may be configured to operate the blower motor according to a second blower parameter different than the first voltage parameter when the ambient temperature is below a threshold temperature.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Hybrid vehicles, such as hybrid electric vehicles (HEVs) and plug-in hybrid electric vehicles (PHEVs), are provided with more than one source of power. Besides the gasoline fuel energy, a hybrid vehicle also has an additional energy source of electrical energy stored in the battery, which may be electric energy from the electric grid deposited in the vehicle's battery during charging. The power management of the hybrid vehicle allocates the drive power demand of the vehicle to one or both of the two energy sources in order to achieve an improved fuel economy and meet the other comparable HEV/PHEV control objectives. While conventional HEVs may be operated in order to maintain the battery State of Charge (SOC) around a constant level, it may be desirable for PHEVs to use as much pre-saved battery electric (grid) energy as possible before the next charge event (when the vehicle is "plugged-in"). To increase fuel economy, the relatively inexpensive, grid-supplied electric energy may be preferentially used to save as much gasoline fuel as possible.

Figure 1:
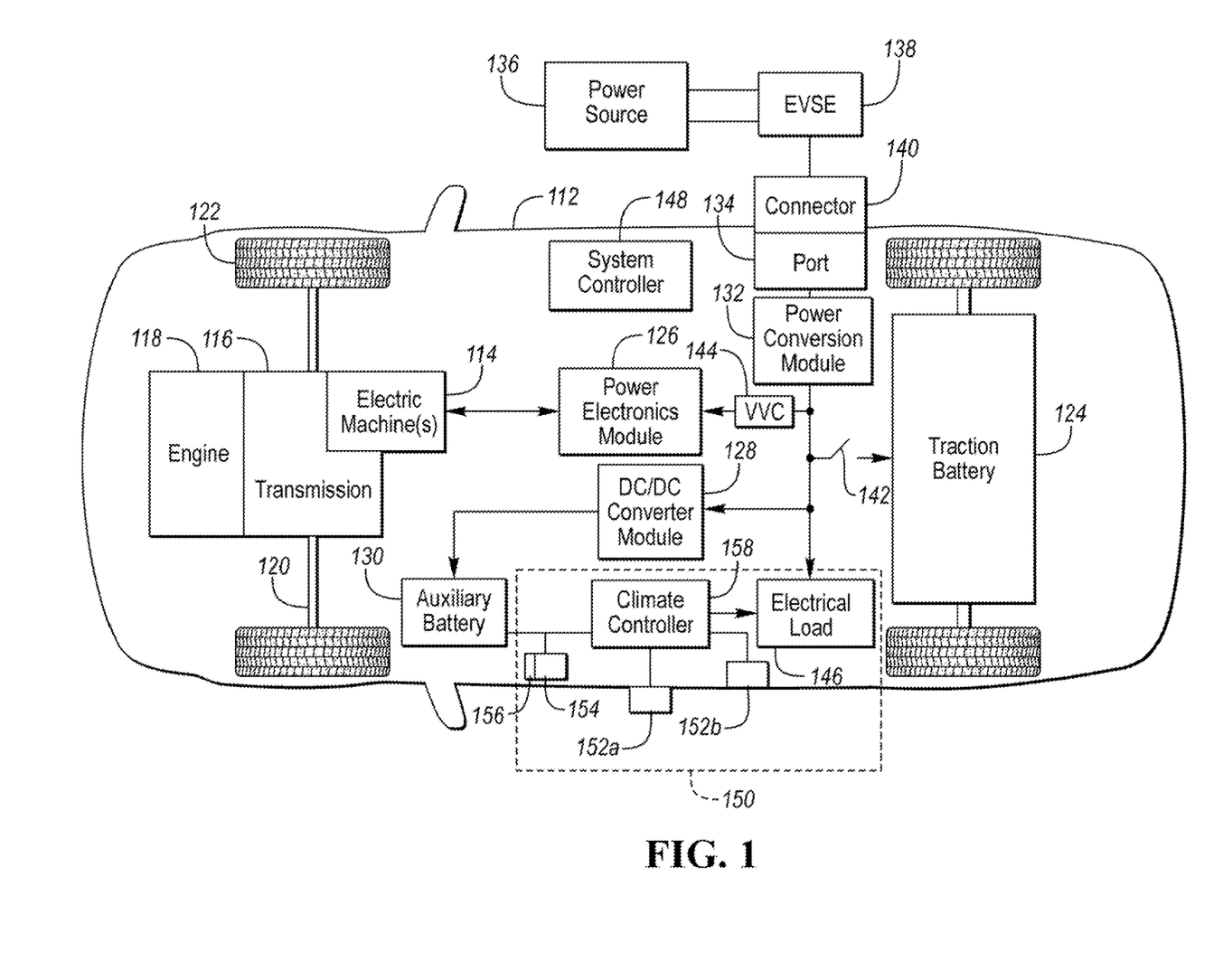
FIG. 1 is a schematic drawing of a vehicle having an electric machine and engine.

FIG. 1 depicts an electrified vehicle 112 that may be referred to as a plug-in hybrid-electric vehicle (PHEV). The vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The power plant of the vehicle may include any number of energy production or maintenance machines (e.g., engines, batteries, capacitors, solar panels, fuel cells, electric machines). The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

The vehicle 112 may be operated in a plurality of different powertrain modes including charge-sustaining mode and charge-depleting mode (also known as EV mode). In charge-depleting mode, the battery is used as the primary source for propulsion until the battery SOC drops below a threshold SOC, at which point, the vehicle switches to charge-sustaining mode. Used herein, the term charge-depletion mode refers to modes where the engine may run periodically and to modes where the engine is not used. For example, the vehicle may include an EV-only mode (also known as EV now) where the engine is disabled.

A traction battery or battery pack 124 stores energy that can be used by the electric machines 114. The vehicle battery pack 124 may provide a high voltage direct current (DC) output. The traction battery 124 may be electrically coupled to one or more power electronic modules 126. One or more contactors 142 may isolate the traction battery 124 from other components when opened and connect the traction battery 124 to other components when closed. The power electronic module 126 is also electrically coupled to the electric machines 114 and provides the ability to bi-directionally transfer energy between the traction battery 124 and the electric machines 114. For example, a traction battery 124 may provide a DC voltage while the electric machine 114 may operate with a three-phase alternating current (AC) to function. The power electronic module 126 may convert the DC voltage to a three-phase AC current to operate the electric machine 114. In a regenerative mode, the power electronic module 126 may convert the three-phase AC current from the electric machine 114 acting as generators to the DC voltage compatible with the traction battery 124.

The vehicle 112 may include a variable-voltage converter (VVC) 144 electrically coupled between the traction battery 124 and the power electronic module 126. The VVC 144 may be a DC/DC boost converter configured to increase or boost the voltage provided by the traction battery 124. By increasing the voltage, current requirements may be decreased leading to a reduction in wiring size for the power electronic module 126 and the electric machine 114. Further, the electric machine 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130.

One or more electrical loads may be coupled to the high-voltage bus. The electrical loads may have an associated controller that operates and controls the electrical loads when appropriate. An example electrical load may be a heater 14, such as a positive temperature coefficient (PTC) heater, a resistive heater, or other type of heater. Other examples of high voltage electrical loads include a fan and an air-conditioning compressor.

The vehicle 112 may be an electric vehicle or a plug-in hybrid vehicle in which the traction battery 124 may be recharged by an external power source 136. The external power source 136 may be a connection to an electrical outlet. The external power source 136 may be electrically connected to electric vehicle supply equipment (EVSE) 138. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically connected to a charger or onboard power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically connected may transfer power using a wireless inductive coupling.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112.

A vehicle system controller (VSC) 148 may be present to coordinate the operation of the various components. The VSC 148 may also be adapted to control a powertrain operating mode of the vehicle 112. For example, the VSC 148 can provide an input to the powertrain that causes the powertrain to operate in at least a charge-sustaining (CS) mode or a charge-depleting (CD) mode. In the CS mode, the engine 118, the electric machine 114, or both can power the drive wheels 122. The CS mode is generally considered a default powertrain mode for normal operation of the electrified vehicle.

In the CD mode, the drive wheels 122 are powered by the electric machine 114, but not the engine 118. The CD mode is generally considered an electric-only operating mode.

In at least one approach, the CD mode may be an available drive mode when the ambient temperature is above a threshold temperature (e.g., −9.5 degrees Celsius (° C.)). As used herein, ambient temperature may refer to the outside ambient temperature; i.e., the temperature outside of the vehicle. In conditions in which the ambient temperature is below a threshold temperature, a drive mode that utilizes the engine 118 to power the drive wheels 122 (such as the CS mode) may be required. In at least another approach, the CD mode may also be an available drive mode when a fluid temperature (e.g., a transmission fluid temperature) is above a threshold fluid temperature.

The vehicle 112 includes a climate control system 150 that includes the heater 146, one or more sensors 152a, 152b, a variable blower control (VBC) 154 in communication with a blower motor 156 that is adapted to operate a blower fan, and a climate controller 158 in communication with the heater 146, the sensors 152a, 152b, and the VBC 154.

The sensors 152a, 152b may be temperature sensors. In at least one approach, a first temperature sensor 152a may be configured to determine, directly or indirectly, an ambient air temperature at an exterior of the vehicle 112. A second temperature sensor 152b may be configured to determine, directly or indirectly, a cabin air temperature at an interior of the vehicle 112.

The blower motor 156 may be may be a variable speed blower motor for delivering air to an interior cabin of the vehicle 112. In this way, in response to a signal from the VBC 154, the blower motor 156 may vary a fan speed of the blower fan.

The climate controller 158 may be a microprocessor-based controller having a central processing unit, internal memory such as RAM and/or ROM, and associated inputs and outputs communicating across a bus. The climate controller 158 may be a portion of a central vehicle main control unit or a stand-alone unit. The climate controller 158 may include various processing units which may be incorporated as separate devices or as an integral part of the climate controller 158. The climate controller 158 may, as is described in greater detail below, control the various motors and actuators of the climate control system based upon the various sensor and control inputs and in accordance with programmed logic or algorithms.

The VBC 154, having any suitable processor, may be in electrical communication with the blower motor 156 via electrical ports, which may correspond to the positive and negative input of the blower motor 156. The VBC 154 may include other connections such as a ground connection or a (pulse width modulation) PWM input from the climate controller 158. In general, the VBC 154 receives a blower speed value at the PWM input from the climate controller 158, and subsequently the VBC 154 changes the revolution speed of the blower motor 102. Alternatively, the VBC 154 may receive a DC voltage, and this DC voltage may be converted to a corresponding PWM signal. In addition, alternate control modules such as an Electronic Automatic Temperature Control (EATC), a Remote Climate Control Module (RCCM), a Dual Automatic Temperature Control (DATC), may also be employed to monitor the blower motor 156.

Figure 2:
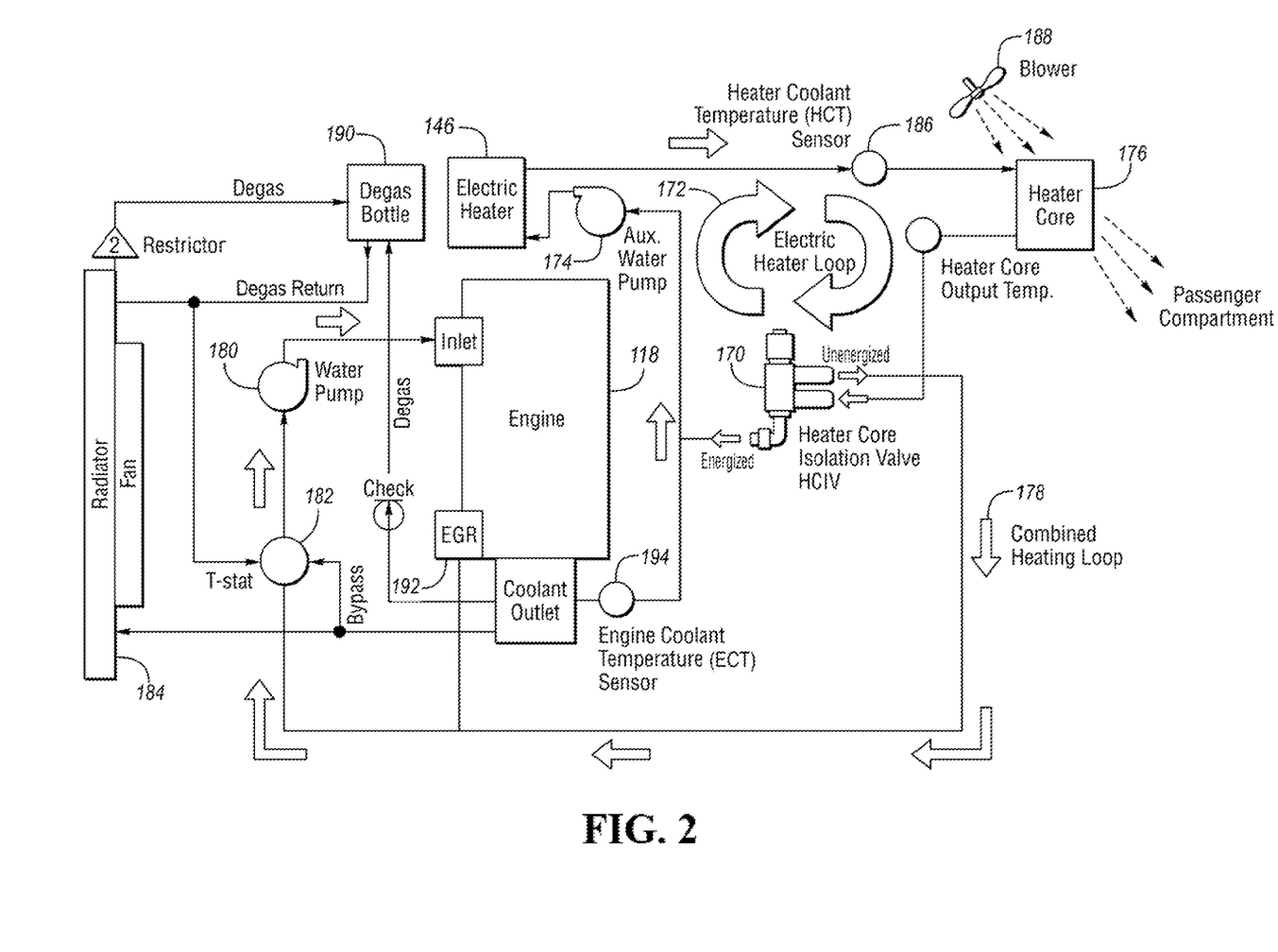
FIG. 2 is a schematic representation of vehicle components implementing a climate control strategy.

One possible system for providing passenger compartment heating for a PHEV is shown in FIG. 2. The system provides two sources of coolant heating. The system may utilize heat from the engine 118 to heat the coolant as in a conventional ICE vehicle. The system may also provide heat via an electric heater 146. Having multiple sources of heat allows flexibility during normal operating conditions and some redundancy during failure modes. The system allows the coolant from the different heat sources to flow through a heater core. The addition of a Heater Core Isolation Valve (HCIV) 170 allows the passenger heater system to select the source of heated coolant. A vehicle system control (VSC) module (148 in FIG. 1) may control the operation of the system. The VSC may determine the heating mode based on the passenger-heating request and the status of the various components in the heating system. To ensure robust operation, the VSC may attempt to work with missing or failed control elements by choosing an appropriate operating mode.

The system may also have an auxiliary water pump 174 to force coolant to flow through the system. A coolant sensor 186 may be included to measure the coolant temperature entering the heater core 176. The coolant flows through a heater core 176 to allow heat to be transferred from the coolant to air entering the passenger compartment. The heat may be transferred from the coolant in the heater core 176 using a blower assembly 188 (which may correspond to the blower motor 156 of FIG. 1) to pass air over the heater core 176 and into the passenger compartment.

The system may also have a water pump 180 to force coolant to flow through the engine 118. The water pump 180 may be mechanically or electrically driven. In certain modes, the water pump 180 may force coolant through the heater core 176 as well. The system may also have a radiator 184 to dissipate heat in the coolant. The system may also have a thermostat 182 to control the flow of coolant between the radiator 184 and the engine 118. The system may also have a degas bottle 190 that may act as a coolant reservoir, remove air from the coolant, and provide pressure relief. The cooling system may further include an exhaust gas recirculation (EGR) 192 system that recirculates a portion of the engine's exhaust gas back to the intake manifold. In addition, the system may have an engine coolant temperature sensor 194 to determine the coolant temperature exiting the engine 118 or the engine coolant temperature exiting the engine may be estimated or inferred from other measurements such as a cylinder head temperature sensor.

The HCIV 170 may be used to activate different coolant loops primarily for cabin heating. In one position, the HCIV 170 forms an electric-only heating loop 172. In this position, the coolant flows in a loop comprised of the HCIV 170, the auxiliary water pump 174, the electric heater 146, and a heater core 176, not limited to that particular order. In another position, the HCIV 170 forms a combined heating loop 178 that passes through the engine 118. In the combined heating loop 178, coolant flows through the HCIV 170, thermostat 182, water pump 180, engine 118, auxiliary water pump 174, electric heater 146, and heater core 176, not limited to that particular order. There is also a separate engine loop in which coolant flows through engine 118, thermostat 182, water pump 180, and the radiator 184, not necessarily in that order. Depending on the mode of operation, in order for coolant to flow in the system one or both of the pumps, 174 or 180, must be activated.

The system has the capability to alter the flow of coolant through the system in response to the desired source of coolant heating. Based on the position of the HCIV 170, coolant may flow in different loops. Separate coolant temperatures may be achieved in each loop depending on the heating/cooling requirements of each loop at a particular time. The addition of the HCIV 170 allows the coolant flow to be modified. The HCIV 170 may be an electrically switched valve that alters the flow of coolant through the system. The HCIV 170 may be a three-port valve that allows one inlet port to be alternately connected to each of the other two outlet ports based on an activation signal. The HCIV 170 may allow the coolant loops to be combined as one larger coolant loop. The HCIV 170 may be switched in such a way to allow coolant to flow from the engine coolant loop through the HCIV 170 to the electric-only heater loop to operate the cabin heating in the electric-only heating loop 172, or with the combined heating loop 178 with the engine 118.

A controller may be used to actuate the HCIV 170. In at least one approach, a solenoid and spring assembly may be used to set a position of the HCIV 170. Depending on the design of the HCIV 170, it may or may not have feedback as to the actual position of the HCIV 170. The position of the HCIV 170 may be ascertained by observing the behavior of the system during operation. In at least one approach, the position of the HCIV 170 may be inferred from a temperature of coolant entering the heat exchanger and a temperature of coolant exiting the engine (for example, as detected at the heater coolant temperature sensor 186 and at the engine coolant temperature sensor).

Referring again to FIG. 1, the climate controller 158 may be adapted to send signals to the VBC 154 to control the speed of the blower motor 156 according to various blower parameters. In at least one approach, the VBC 154 may control the speed of the blower motor 156 according to a current input at the blower motor 156. In at least one other approach, the VBC 154 may control the speed of the blower motor 156 according to voltage input at the blower motor 156. In at least one other approach, the VBC 154 may control the speed of the blower motor 156 according to a speed (e.g., revolutions per minutes) at the blower motor 156.

Control of the blower motor 156 allows a vehicle occupant to select a desired air flow rate by setting a fan speed to, for example, OFF, LOW, MED, HIGH, or AUTO. At the LOW, MED, and HIGH settings, a specific voltage may be supplied to blower motor 156. The voltage applied may correspond to the respective desired air flow rates. At the AUTO setting, the voltage supplied to blower motor 156 is controlled by the climate controller 158 (to be described in more detail below) as necessary to achieve desired conditions.

The climate controller 158 may be adapted provide a manual temperature control mode. When an air flow rate (blower speed) is selected by an occupant, the climate controller 158 sends a signal to set the voltage powering the blower motor 156. The voltage to be used may depend on the operating mode selected and may be contained in look-up tables in the memory of climate controller 158.

The climate controller 158 may also be adapted to provide an automatic climate control mode for automatically controlling the climate within the cabin of the vehicle. An automatic climate control mode may allow the climate controller 158 to regulate passenger cabin temperature as well as control various climate control functions automatically based upon environmental conditions and/or vehicle operating characteristics. For example, when the AUTO setting is selected, the climate controller 158 may apply preprogrammed logic and memory to determine and direct, based upon sensor and operator control inputs, the correct temperature, mode, and blower speed required to achieve maximum comfort in the cabin. When such an automatic mode is selected, the climate controller 158 may vary the blower speed by adjusting the voltage powering the blower motor 156 anywhere between zero volts (blower off) and the maximum system voltage (blower full speed). A passenger vehicle may, for example, utilize a 9 volt (9V) or a 14 volt (14V) electrical system. For the example discussed in this disclosure, 14V shall be considered to equate to blower full speed. Some blower motors cannot operate properly at voltages below a certain lower limit. In the example system described herein, the designed minimum operating voltage for the blower motor may be assumed to be 4 volts.

In this way, a driver may input (e.g., at a center console of the vehicle 112) a control such as a target or set point cabin temperature, and data supplied by sensors (e.g., second sensor 152b) may be used to introduce appropriately temperature-controlled and/or air-conditioned air into the passenger cabin to adjust the cabin temperature as desired by the user. For example, if the measured temperature of the interior air is below the desired temperature, then the air stream supplied to the cabin may be heated more strongly or cooled to a lesser degree, and/or the intensity (rate of flow) of the heated or cooled air stream is correspondingly changed.

When the vehicle 112 is operated in a charge sustaining mode, the engine 118 is on and may be used as a heat source for heating air that is to supplied to the cabin of the vehicle 112. For example, the vehicle 112 may utilize engine waste heat absorbed by an engine cooling system to provide cabin heating to a plurality of heat exchangers.

However, in a CD mode, the engine 118 is shut off and may be unavailable to act as heat source. In this way, the vehicle 112 may be provided with a heater 146. The heater 146 may apply heat into a cooling circuit so that the cabin of the vehicle 112 can be heated while keeping the engine 118 off.

In many instances, the climate control system 150, as operated by the climate controller 158, requires significantly more time to heat the passenger cabin to the desired temperature when the heater 146 is the only heat source (e.g., in the CD mode), as compared to when the engine 118 is available as a heat source (e.g., in the CS mode).

As such, when the vehicle is operated in the CD mode in certain cold conditions (such when the ambient temperature is in the range of approximately 0 to approximately −9.5° C.), the blower motor 156 may blow relatively cold air into the cabin for a greater amount of time as compared to if the vehicle 112 were operated in the CS mode. When the climate control system 150 is also operating in an automatic temperature control mode, the user may be surprised by a sustained discharge of cool air.

In this way, the climate control system 150 may be provided with mode-dictated operating conditions. More particularly, the climate controller 158 may be adapted to operate the blower motor 156 according to a first set of parameters when the vehicle 112 is operated in a first drive mode when the ambient temperature is at or below a predefined temperature, and to operate the blower motor 156 according to a second set of parameters when the vehicle 112 is operated in a second drive mode when the ambient temperature is at or below the predefined temperature, and optionally, when the climate control system 150 is in an automatic climate control mode.

The sets of parameters may be stored in a memory (e.g., in a memory of climate controller 158). The sets of parameters may be in the form of a look-up table, which includes at least one threshold temperature ($T_{tN}$) and at least one voltage parameter corresponding to the threshold temperature. The threshold temperature may be a plurality of threshold temperatures (e.g., $T_1$, $T_2$, etc.), and may be referred to as step temperatures. The voltage parameters may similarly be a plurality of voltage parameters (e.g., $V_1$, $V_2$, etc.). The voltage parameters may be also be a function of the climate control mode (e.g., automatic climate control or manual climate control). An exemplary set of parameters is shown in Table 1 below.

TABLE 1

| T (° C.) | $T_{t1}$ | $T_{t2}$ | $T_{t3}$ | $T_{t4}$ | $T_{t5}$ | $T_{t6}$ |
|---|---|---|---|---|---|---|
| $V_{AUTO}$ | $V_1$ | $V_2$ | $V_3$ | $V_4$ | $V_5$ | $V_6$ |
| $V_{MANUAL}$ | $V_7$ | $V_8$ | $V_9$ | $V_{10}$ | $V_{11}$ | $V_{12}$ |

When an outside ambient temperature ($T_a$) is at or below a step threshold temperature ($T_t$), the climate controller 158 may be adapted to operate the blower motor 156 according to an associated voltage. In at least one approach, $T_{t1} < T_{t2} < T_{t3} < T_{t4} < T_{t5} < T_{t6}$. As discussed in greater detail elsewhere herein, when the vehicle is operating in a first mode (e.g., a CS mode) and the climate control system is operating in an automatic climate control mode, the voltages may be: $V_1 > V_2 > V_3 = V_4 = V_5 < V_6$. When the vehicle is operating in the first mode (e.g., CS mode) and the climate control system is operating in a manual climate control mode, the voltages may be: $V_7 = V_8 = V_9 = V_{10} = V_{11} = V_{12}$. When the vehicle is operating in a second mode (e.g., a CD mode) and the climate control system is operating in an automatic climate control mode, the voltages may be: $V_1 < V_2 < V_3 < V_4 < V_5 < V_6$. When the vehicle is operating in the second mode (e.g., CD mode) and the climate control system is operating in a manual climate control mode, the voltages may be: $V_7 < V_8 < V_9 < V_{10} = V_{11} = V_{12}$.

The voltages provided in the tables set forth herein may be maximum voltages for a step threshold temperature. As such, the climate controller 158 may be adapted to operate the blower motor 156 according to voltages less than the maximum voltage for a step threshold temperature.

As discussed, the climate controller 158 may be adapted to operate the blower motor 156 according to a first set of parameters when the vehicle 112 is operated in a first drive mode (such as a CS mode) when the ambient temperature is at or below a predefined temperature, and to operate the blower motor 156 according to a second set of parameters when the vehicle 112 is operated in a second drive mode (such as a CD mode) when the ambient temperature is at or below the predefined temperature.

In at least one approach, when the engine 118 is being used to propel the vehicle (CS mode), the climate controller 158 may be adapted to operate the blower motor 156 according to the first set of parameters. An exemplary first set of parameters is shown in Table 2 below.

TABLE 2

| T (° C.) | −9.5 | −5 | 0 | 5 | 16 | 32 |
|---|---|---|---|---|---|---|
| $V_{AUTO}$ | 11 | 10.5 | 9 | 9 | 9 | 11 |
| $V_{MANUAL}$ | 13.5 | 13.5 | 13.5 | 13.5 | 13.5 | 13.5 |

As shown in Table 2, the climate controller 158 may be adapted to operate the blower motor 156 according to the same (or similar) voltage parameters when the ambient temperature corresponds to the various threshold temperatures. This may be, for example, because operation of the engine 118 in the first drive mode may heat (or have the capability to heat) the air to be passed into the passenger cabin to a desired temperature in a relatively short period of time (e.g., 6 minutes). As such, a reduction in voltage to the blower motor 156 may be unnecessary.

When the electric machine 114 and not the engine 118 is propelling the vehicle, the engine 118 may not be available to heat the air to be passed into the passenger cabin. Instead, the heater 146 may be the sole (or primary) source of heat. The heater 146 may heat the air to be passed into the passenger cabin to a desired temperature at a relatively slower rate than the engine 118, or the heater 146 may not be capable of heating the air to be passed into the cabin to an adequate temperature. In this way, when the electric machine 114 and not the engine 118 is propelling the vehicle, the climate controller 158 may be adapted to operate the blower motor 156 according to the second set of parameters. An exemplary second set of parameters is shown in Table 3 below.

TABLE 3

| T (° C.) | −9.5 | −5 | 0 | 5 | 16 | 32 |
|---|---|---|---|---|---|---|
| $V_{AUTO}$ | 7 | 8 | 8.5 | 9 | 9 | 11 |
| $V_{MANUAL}$ | 9 | 10 | 11.5 | 13.5 | 13.5 | 13.5 |

As shown, the climate controller 158 may reduce the voltage for operating the blower motor 156 as a function of the ambient temperature when the electric machine 114 and not the engine 118 is propelling the vehicle. In this way, the maximum speed of the blower fan may be reduced, so as to reduce airflow into the passenger cabin.

In an optional approach, the climate controller 158 may reduce the voltage for operating the blower motor 156 as an additional function of the climate control mode. For example, when the vehicle is operating in an automatic climate control mode, the climate controller 158 may reduce the voltage for operating the blower motor 156 according to a first mode strategy, such as $V_{AUTO}$ strategy shown in Table 3. When the vehicle is operating in a manual climate control mode, the climate controller 158 may reduce the voltage for operating the blower motor 156 according to a second mode strategy, such as $V_{MANUAL}$ strategy shown in Table 3. As shown, the voltages in the second mode strategy may be greater than the voltages in the first mode strategy for a given threshold temperature.

Figure 3:
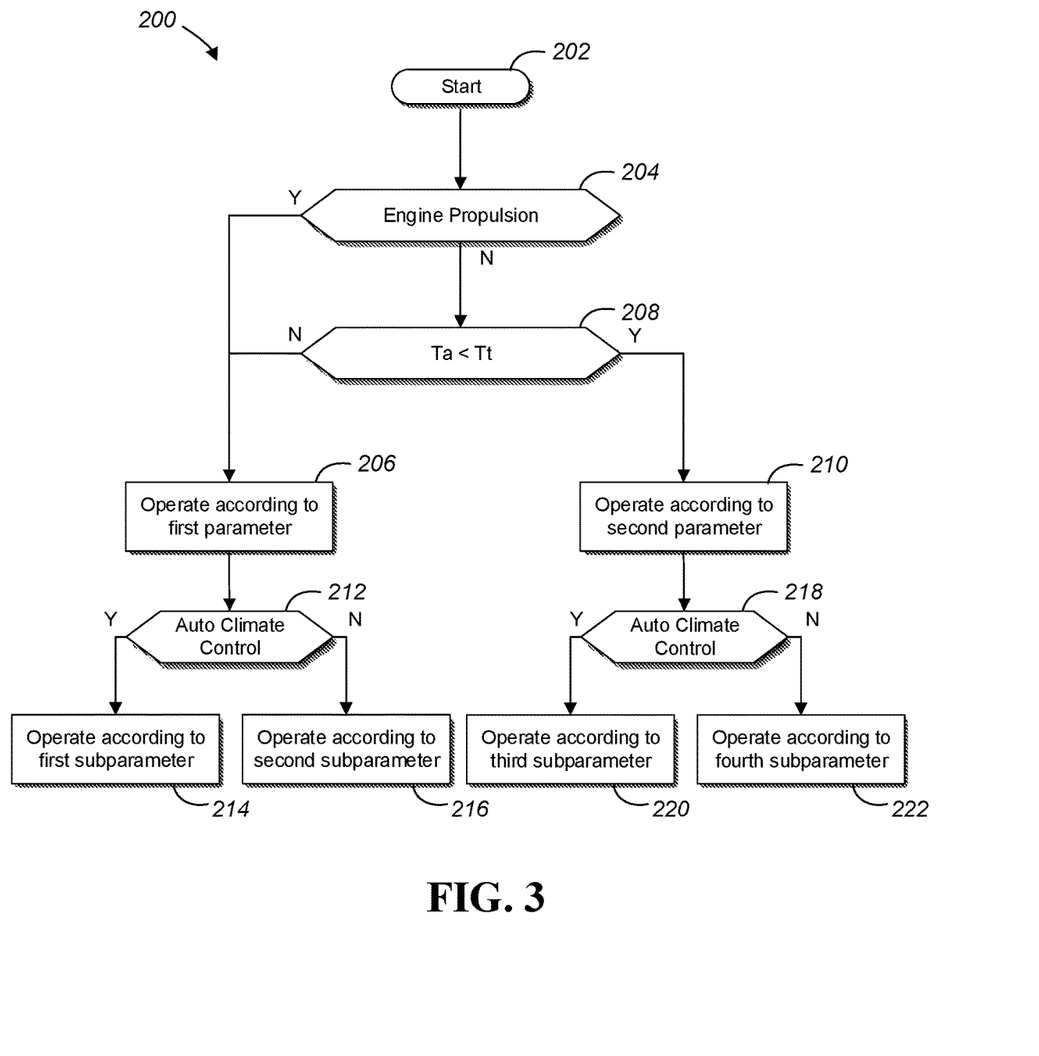
FIG. 3 is a flow chart of a blower motor control algorithm.

Referring to FIG. 3, a method 200 of operating a vehicle climate system when an ambient temperature is below a threshold temperature is shown. The method 200 begins with start 202, which may correspond, for example, to a vehicle startup routine, such as when a user turns on or activates one or more vehicle systems (e.g., when a key fob is within a proximity of the vehicle, when a user presses a vehicle startup button, or when a user inserts a key into a receptacle of the vehicle). The method 200 may also or instead start 202 after a vehicle startup routine, such as during a drive event. In this way, the method 200 may be initiated, for example, in response to a battery state of charge (SOC) reaching or falling to a threshold SOC.

At step 204, a vehicle operation mode is determined. For example, at step 204, it may be determined whether an engine is being used to propel the vehicle. In at least one approach, the method may include the step of receiving (e.g., at a controller such as climate controller 158) a signal indicative of a vehicle operation mode. The signal may be transmitted, for example, by a controller adapted to control the vehicle operation mode (e.g., VSC 148). In at least one approach, the vehicle operating state is a CAN signal sent from VSC 148 to the climate controller 158. The vehicle operation mode may be at least one of a first vehicle operation mode, such as a CS mode wherein the engine is being used to propel the vehicle, and a second vehicle operation mode, such as a CD mode wherein the traction battery and not the engine is being used to propel the vehicle.

When an engine is being used to propel the vehicle (e.g., when the vehicle is operating in a CS mode), the method 200 may proceed to 206 wherein the blower motor is operated according to a first blower parameter. The first blower parameter may correspond to a parameter provided in Table 2 above, and may be, for example, a first voltage for operating the blower motor.

When an engine is not being used to propel the vehicle, such as when an electric machine is the primary or only source of vehicle propulsion (e.g., when the vehicle is operating in a CD mode), the method 200 may proceed to step 208. At step 208, it is determined (e.g., at a controller such as climate controller 158) whether an ambient temperature (e.g., outside ambient temperature) is below a threshold temperature. The threshold temperature may be, for example, in the range of approximately 0 to approximately −9.5° C.

If the ambient temperature is not below the threshold temperature, the method 200 may proceed to 206 wherein the blower motor is operated according to a first blower parameter.

If the ambient temperature is below the threshold temperature, the method 200 may proceed to 210, wherein the blower motor is operated according to a second blower parameter. The second blower parameter may correspond to a parameter provided in Table 3 above, and may be a second voltage for operating the blower motor. The second blower parameter may be different than the first blower parameter. For example, the second voltage may be lower than the first voltage.

In at least one optional approach, when operating according to the first blower parameter, the method 200 may include the additional step 212 of determining if an automatic climate control mode is enabled. The automatic climate control mode may, for example, include a target cabin temperature, which may be a user-defined target cabin temperature. In response to determining the automatic climate control mode is enabled, the method may include operating 214 the blower motor according to a first subparameter of the first blower parameter. The first subparameter may correspond, for example, to the $V_{AUTO}$ parameters in Table 2 above. In response to determining the automatic climate control mode is not enabled, the method may include operating 216 the blower motor according to a second subparameter of the first blower parameter. The second subparameter may correspond, for example, to the $V_{MANUAL}$ parameters in Table 2 above.

In at least one optional approach, when operating according to the second blower parameter, the method 200 may include the additional step 218 of determining if an automatic climate control mode is enabled. In response to determining the automatic climate control mode is enabled, the method may include operating 220 the blower motor according to a third subparameter of the second blower parameter. The third subparameter may correspond, for example, to the $V_{AUTO}$ parameters in Table 3 above. In response to determining the automatic climate control mode is not enabled, the method may include operating 222 the blower motor according to a fourth subparameter of the second blower parameter. The fourth subparameter may correspond, for example, to the $V_{MANUAL}$ parameters in Table 3 above.

In at least one approach, multiple threshold temperatures may be provided. For example, the threshold temperature may include at least a first step temperature and a second step temperature. The second step temperature may be lower than the first step temperature.

In at least one approach, the second blower parameter may include at least a first voltage that may, for example correspond to the first step temperature, and a second voltage that may, for example, correspond to the second step temperature. The second voltage may be lower than the first voltage. In this way, when the traction battery and not the engine is being used to propel the vehicle, the climate controller may be adapted to operate the blower motor at the first voltage when the ambient temperature corresponds to the first step temperature, and to operate the blower motor at the second voltage when the ambient temperature corresponds to the second step temperature.

In at least one approach, the first blower parameter may include at least a third voltage that may, for example correspond to the first step temperature, and a fourth voltage that may, for example correspond to the second step temperature. The third voltage may be greater than the first voltage. The fourth voltage may be lower than the third voltage, and may be greater than the second voltage. In this way, when the engine is being used to propel the vehicle, the climate controller may be adapted to operate the blower motor at the third voltage when the ambient temperature corresponds to the first step temperature, and to operate the blower motor at the fourth voltage when the ambient temperature corresponds to the second step temperature.

In at least one approach, the method may further include changing vehicle operation modes when the ambient temperature is below a threshold ambient temperature. For example, the vehicle operation mode may change from a pure-electric to an engine-propelled mode or hybrid mode when the ambient temperature is below −9.5° C.

In at least one approach, when a vehicle operation mode is changed from a pure electric mode (e.g., CD mode) to engine or hybrid mode (e.g., CS mode), the method may include determining a HCIV position before switching between sets of blower parameters. The method may also, or instead, include determining a delta between an engine coolant temperature and heater core temperature before switching between sets of blower parameters. This may be, for example, because the engine coolant temperature may take several minutes to warm up to the heater core coolant temperature before the HCIV moves to an open position. If the control head switches to the first blower parameter table immediately after the vehicle operation mode is switched from a CD mode to a CS mode, and where the engine coolant temperature may be still much colder than heater core coolant temperature, the discharge air temperature may drop significantly and may cause user discomfort due to the blowing of cold air.

In at least one approach, a method of operating a vehicle climate system when an ambient temperature is below a threshold temperature is provided. The method may include, responsive to ambient temperatures less than a threshold, operating a blower motor at a voltage that depends on whether the vehicle is in charge sustain mode or charge deplete mode. In the charge sustain mode, an engine may be used to propel the vehicle. In the charge deplete mode, an electric machine and not the engine may be used to propel the vehicle. The method may further include responsive to ambient temperatures greater than the threshold, operating the blower motor at a voltage that does not depend on whether in the charge sustain or charge deplete modes.

The method may further include, responsive to ambient temperatures less than the threshold, operating the blower motor at a first voltage when the vehicle is in the charge sustain mode, and operating the blower motor at a second voltage less than the first voltage when the vehicle is in the charge deplete mode.

The method may further include, responsive to a battery state of charge (SOC) being less than a SOC threshold when the vehicle is in the charge deplete mode, using an engine to propel the vehicle. The method may further include operating the blower motor at the first voltage.

In at least one approach, a method of operating a vehicle climate system when an ambient temperature is below a threshold temperature is provided. The method may include, responsive to ambient temperatures less than a threshold, operating a blower motor at a voltage that depends on whether the vehicle climate system is operating in an automatic climate control mode or a manual climate control mode. The method may further include, responsive to ambient temperatures greater than the threshold, operating the blower motor at a voltage that does not depend on whether the vehicle climate system is operating in the automatic climate control mode or the manual climate control mode.

In at least one approach, the method may further include, responsive to ambient temperatures less than the threshold, operating the blower motor at a voltage that further depends on whether the vehicle climate system is operating in an automatic climate control mode or a manual climate control mode.

In at least one approach, the method may further include, by the controller and responsive to ambient temperatures less than the threshold, operating the blower motor at a first voltage when the vehicle climate system is operating in the automatic climate control mode, and operating the blower motor at a second voltage greater than the first voltage when the vehicle climate system is operating in the manual climate control mode.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method of operating a vehicle climate system for a vehicle, comprising:
   by a controller:
      responsive to ambient temperatures less than a threshold, operating a blower motor at a voltage that depends on whether the vehicle is in charge sustain mode or charge deplete mode and that further depends on whether the vehicle climate system is operating in an automatic climate control mode or a manual climate control mode; and
      responsive to ambient temperatures greater than the threshold, operating the blower motor at a voltage that does not depend on whether the vehicle is in the charge sustain or charge deplete modes.

2. The method of claim 1 wherein in the charge sustain mode, an engine is being used to propel the vehicle, and wherein in the charge deplete mode, an electric machine and not the engine is being used to propel the vehicle.

3. The method of claim 1 further comprising:
   by the controller:
      responsive to ambient temperatures less than the threshold,
         operating the blower motor at a first voltage when the vehicle is in the charge sustain mode; and
         operating the blower motor at a second voltage less than the first voltage when the vehicle is in the charge deplete mode.

4. The method of claim 3 further comprising:
   responsive to a battery state of charge (SOC) being less than a SOC threshold when the vehicle is in the charge deplete mode:
      using an engine to propel the vehicle; and
      operating the blower motor at the first voltage.

5. The method of claim 1 further comprising:
   by the controller:
      responsive to ambient temperatures less than the threshold,
         operating the blower motor at a first voltage when the vehicle climate system is operating in the automatic climate control mode; and
         operating the blower motor at a second voltage greater than the first voltage when the vehicle climate system is operating in the manual climate control mode.

* * * * *